(12) United States Patent
Boehler et al.

(10) Patent No.: US 10,400,801 B2
(45) Date of Patent: Sep. 3, 2019

(54) COMPACT UNIT

(71) Applicant: HYDAC FLUIDTECHNIK GMBH, Sulzbach/Saar (DE)

(72) Inventors: Andreas Boehler, Saarbruecken (DE); Markus Kuhn, Wadern-Krettnich (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 272 days.

(21) Appl. No.: 15/120,155

(22) PCT Filed: Jan. 14, 2015

(86) PCT No.: PCT/EP2015/000053
§ 371 (c)(1),
(2) Date: Aug. 19, 2016

(87) PCT Pub. No.: WO2015/124248
PCT Pub. Date: Aug. 27, 2015

(65) Prior Publication Data
US 2017/0058923 A1  Mar. 2, 2017

(30) Foreign Application Priority Data

Feb. 20, 2014 (DE) ........................ 10 2014 002 410

(51) Int. Cl.
*F04B 53/08* (2006.01)
*F15B 21/042* (2019.01)
*F04B 17/03* (2006.01)
*F04B 17/06* (2006.01)
(Continued)

(52) U.S. Cl.
CPC ............ *F15B 21/042* (2013.01); *F04B 17/03* (2013.01); *F04B 17/06* (2013.01); *F04B 53/08* (2013.01);
(Continued)

(58) Field of Classification Search
CPC ............................... F04B 53/08; F15B 21/042
See application file for complete search history.

(56) References Cited

U.S. PATENT DOCUMENTS 6,146,113 A   11/2000  Fassnacht et al.
6,589,029 B1   7/2003  Heller
(Continued)

FOREIGN PATENT DOCUMENTS

CN   103328825   9/2013
DE   44 21 375   12/1995
(Continued)

OTHER PUBLICATIONS

International Search Report (ISR) dated Aug. 10, 2015 in International (PCT) Application No. PCT/EP2015/000053.
(Continued)

*Primary Examiner* — F Daniel Lopez
(74) *Attorney, Agent, or Firm* — Wenderoth, Lind & Ponack, L.L.P.

(57) ABSTRACT

A compact unit has an electric motor accommodated in housing parts (7, 55) of a unit housing (45) and driving at least one hydraulic pump and giving off heat at the same time, an air heat-exchanging device, and a fan (19) drivable to produce an air flow. A flow-conducting device (47, 55) divides the air flow at least in a first partial flow flowing around the electric motor and a second partial flow flowing to the heat-exchanging device in the unit housing (45). Alternatively, arranged in series, the air flow first flows against the electric motor and then the heat-exchanging device, or that the incidence of the air flow occurs at least partially in the reverse direction.

17 Claims, 3 Drawing Sheets

(51) Int. Cl.
*F04B 53/16* (2006.01)
*H02K 5/20* (2006.01)
*H02K 9/04* (2006.01)
*F04D 29/32* (2006.01)
*F15B 1/26* (2006.01)
*F15B 11/16* (2006.01)

(52) U.S. Cl.
CPC ............ *F04B 53/16* (2013.01); *F04D 29/325* (2013.01); *F15B 1/26* (2013.01); *F15B 11/16* (2013.01); *H02K 5/20* (2013.01); *H02K 9/04* (2013.01); *F15B 2211/20515* (2013.01)

(56) References Cited

U.S. PATENT DOCUMENTS 8,215,927 B2 * 7/2012 Niwa ...................... F04B 53/08
417/366
2013/0209285 A1   8/2013 Ladron de Guevara Rangel

FOREIGN PATENT DOCUMENTS

| DE | 196 52 706 | 6/1997 |
| DE | 197 11 591 | 9/1998 |
| DE | 197 36 364 | 2/1999 |
| DE | 199 20 563 | 11/2000 |
| DE | 10 2007 048 510 | 4/2009 |
| DE | 10 2008 034 175 | 1/2010 |
| DE | 10 2010 056 567 | 7/2012 |
| EP | 1 520 995 | 4/2005 |
| EP | 2 217 499 | 10/2011 |
| TW | 366091 | 8/1999 |
| TW | 201305429 | 2/2013 |

OTHER PUBLICATIONS

Notification for the Opinion of Examination dated Oct. 16, 2018 in Taiwanese Patent Application No. 104104328, including Search Report.

* cited by examiner

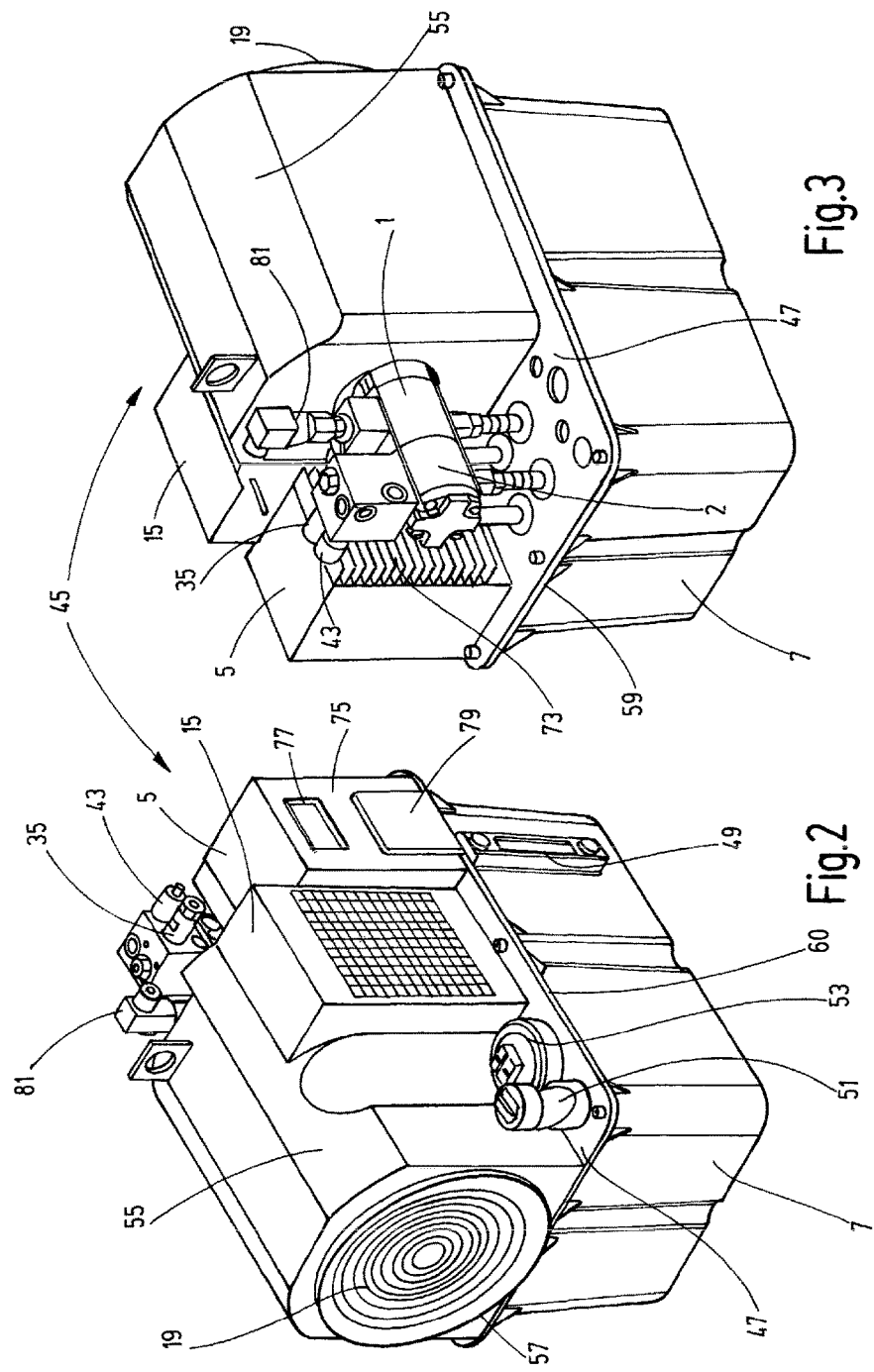

COMPACT UNIT

FIELD OF THE INVENTION

The present invention relates to a compact unit, at least including an electric motor accommodated in housing parts of a unit housing. The electric motor drives at least one hydraulic pump and gives off heat in the process. An air-heat exchanging device and a fan which can be driven to produce an air flow are also included.

BACKGROUND OF THE INVENTION

Compact units of this type are prior art. Such units are used for supplying pressure to hydraulic circuits, in particular, when working hydraulics are to be supplied with pressurized hydraulic liquid at locations in which only a limited amount of space is available. When units are required to be operated continuously in cramped locations, as a result, steps have to be taken for cooling the motor and for cooling the hydraulic fluid. The accommodation of the all the components, including hydraulic pump and heat exchanging device in a housing having small dimensions, creates multiple difficulties. For example, difficulties are created when hydraulics of manufacturing machines, such as lathes, must be supplied with pressurized fluid in closed factory buildings.

SUMMARY OF THE INVENTION

In view of these problems, an object of the invention is to provide an improved compact unit, which is distinguished by a particularly space-saving design, and in which all elementary components for a functionally reliable operation are integrated in a common housing.

This object is basically achieved according to the invention by a compact unit, which includes, as a substantial distinctive feature of the invention, a flow conductor present in the compact housing that forms partial flows from the air flow generated by the fan. One flow is around the electric motor for the purpose of cooling same. Another flow is toward the heat exchanging device. Alternatively, the airflow flows, in succession, first toward the electric motor and then toward the heat exchanging device. Part of the invention also includes in the compact unit according to the invention reversing the direction of the air flow, so that the air flows in each case in the direction opposite that described above. The formation of partial flows in the interior of the unit housing is advantageous, first of all because the components can be arranged to be cooled in the unit housing in any position relative to the fan that generates the air flow, i.e., at installation points at which the installation space in the unit housing is optimally utilized. In that way, a particularly efficient flow around mainly components to be cooled, such as the electric motor, is achieved. Due to the respective potential air flow, all elementary components of the compact unit, such as the electric motor, the air-heat exchanging device, as well as the fan, can be integrated in a single housing. In this way, a functionally more reliable continuous operation of the compact unit is also achieved.

Due to the demonstrated air flow guidance, an overpressure can be generated to a certain degree in the interior of the device housing, so that all sensitive parts inside the housing are protected by the housing from dust and potential spray water. Because of the overpressure condition present during operation, a higher IP protection class or IP degree of protection, in this case IP 54, can be readily achieved.

For an efficient flow around the electric motor, the arrangement in this regard may be obtained in an advantageous manner, such that the electric motor is disposed in the air flow between the fan and the heat exchanging device.

In particularly advantageous exemplary embodiments, the flow conductor forms an additional partial flow from the air flow, which additional partial flow serves as a cooling air flow for a frequency converter provided for controlling the electric motor. Controlling the electric motor as needed by a frequency converter makes a particularly energy-efficient operation possible. The cooling of the frequency converter by the partial flow divided off from the airflow ensures a high operational safety of the unit, even during continuous operation.

In particularly advantageous exemplary embodiments, the flow conductor for the airflow defines a first and second flow paths. The first flow path extends between the front side and the opposing rear side of the unit housing, and in which the fan, the electric motor and a cooling body of the frequency converter are situated. The second flow path diverges from the first flow path and branches off toward one side of the unit housing, preferably at a right angle, where the heat exchanging device is disposed. This arrangement allows the heat exchanging device with a corresponding large flow-through surface to be disposed along a housing side next to the electric motor in such a way that the base area of the housing is well utilized. The first flow path and the second flow path may also be disposed in series one behind the other, so that air flows first toward the electric motor and subsequently toward the heat exchanging device.

In particularly advantageous exemplary embodiments, the electric motor drives both a first hydraulic pump and a second hydraulic pump, which pumps are connected on their intake side to a tank supplying a hydraulic fluid. The first hydraulic pump generates a fluid flow through the heat exchanging device to the tank. The second hydraulic pump serves to supply pressure to working hydraulics. A filter device is preferably provided in each case between the tank and the intake sides of the hydraulic pumps. The functions of these pumps may also be switched. If necessary, only one pump is also sufficient to ensure the fluid transport function. In the case of two pumps, one of the pumps can be actuated by a different and/or external drive.

A particularly compact design can be implemented if the tank forms a base part in the unit housing, on which base part the fan, the electric motor and first and second hydraulic pumps are disposed on a cover plate of the tank in an axial direction from the front side to the rear side. The heat exchanging device is disposed alongside the electric motor. The frequency converter is disposed alongside of the hydraulic pumps.

In a structure of this type, on a tank forming an integral base part of the unit, the support plate of the tank and a housing cover surrounding the fan and the electric motor may be particularly advantageously provided as components of the flow conductor. In this way, the flow conductor also forms a type of enclosure for sound insulation. For volume production, these housing elements may be advantageously manufactured as plastic injection molded parts or as die-cast aluminum parts. A favorable sound insulation is also achieved by the respective housing material.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 2 is a perspective view of the exemplary embodiment of the compact unit, as viewed from a front side and a wide side with a heat exchanging device situated thereon;

FIG. 3 is a perspective view of the exemplary embodiment of the compact unit as viewed from the wide side, opposite the heat exchanging device, and the rear side of the unit housing.

DETAILED DESCRIPTION OF THE INVENTION

Figure 1:
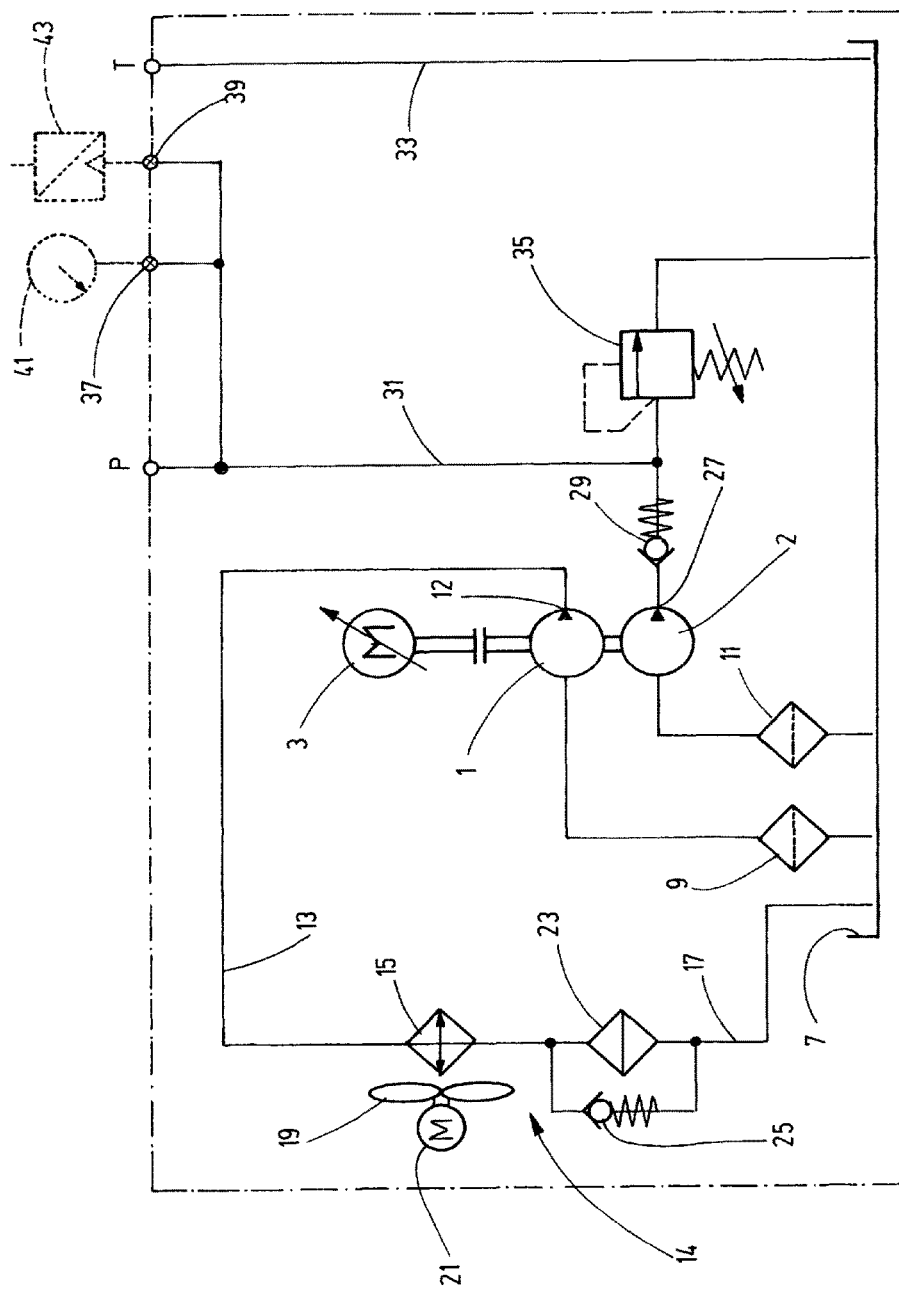
FIG. 1 is a symbolic circuit diagram of the hydraulic circuit of a compact unit according to an exemplary embodiment of the invention.

As shown in FIG. 1, a first hydraulic pump 1 and a second hydraulic pump 2 may be jointly driven by an electric motor 3. The speed of electric motor 3 may be regulated by a frequency converter 5 visible in FIGS. 2 and 3. Both hydraulic pumps 1 and 2 are connected on their intake sides to a tank 7 supplying hydraulic fluid. A filter element 9 or 11 is disposed in each case in the connection to the intake side of each of the pumps 1 and 2. The hydraulic pump 1 serves as a delivery pump for a heat exchanging device or heat exchanger 14, having a feed line 13 connected on the pressure side 12 of the pump 1, an oil-air heat exchanger 15 and a return line 17 leading to the tank 7. A fan 19 generates an airflow and may be actuated by a fan drive, in the present example, in the form of an electric fan motor 21. If desired, a return line filter 23 may be provided in the return line 17, as is depicted in the circuit diagram in FIG. 1. The return line filter 23 may be circumvented by a bypass having a bypass valve 25 set to an opening pressure of, for example, 3 bar.

The pressure side 27 of the second hydraulic pump 2 is connected via a check valve 29 to a pressure line 31, which leads to a pressure connection P of the unit. Via pressure line 31, the assigned hydraulic circuit may be supplied, from which hydraulic circuit the return flow volumes flow back to the tank 7 via a tank connection T and a tank line 33. The pressure line 31 is secured toward the tank 7 via a pressure limiting valve 35. The pressure limiting valve 35 is set, for example, at 45 bar. The electric motor may be set by the frequency converter 5 to an operating speed of, for example, 600 to 2000 1/min, at a maximum speed of, for example 3200 1/min with an output of, for example, 1.5 Kw. In addition to the pressure connection P and at least one tank connection T, measurement connections 37 and 39 for a manometer 41 and a pressure sensor 43 are connected to the pressure line 31. The pumps 1 and 2 may also be switched with one another in terms of their function. Also, instead of a coupled drive, pumps 1, 2 may be driven individually, if applicable, and by an external drive source situated outside the compact unit. The respective size or the performance capacity of the each hydraulic pump used may differ from one another, in particular, may be kept variable.

Figure 4:
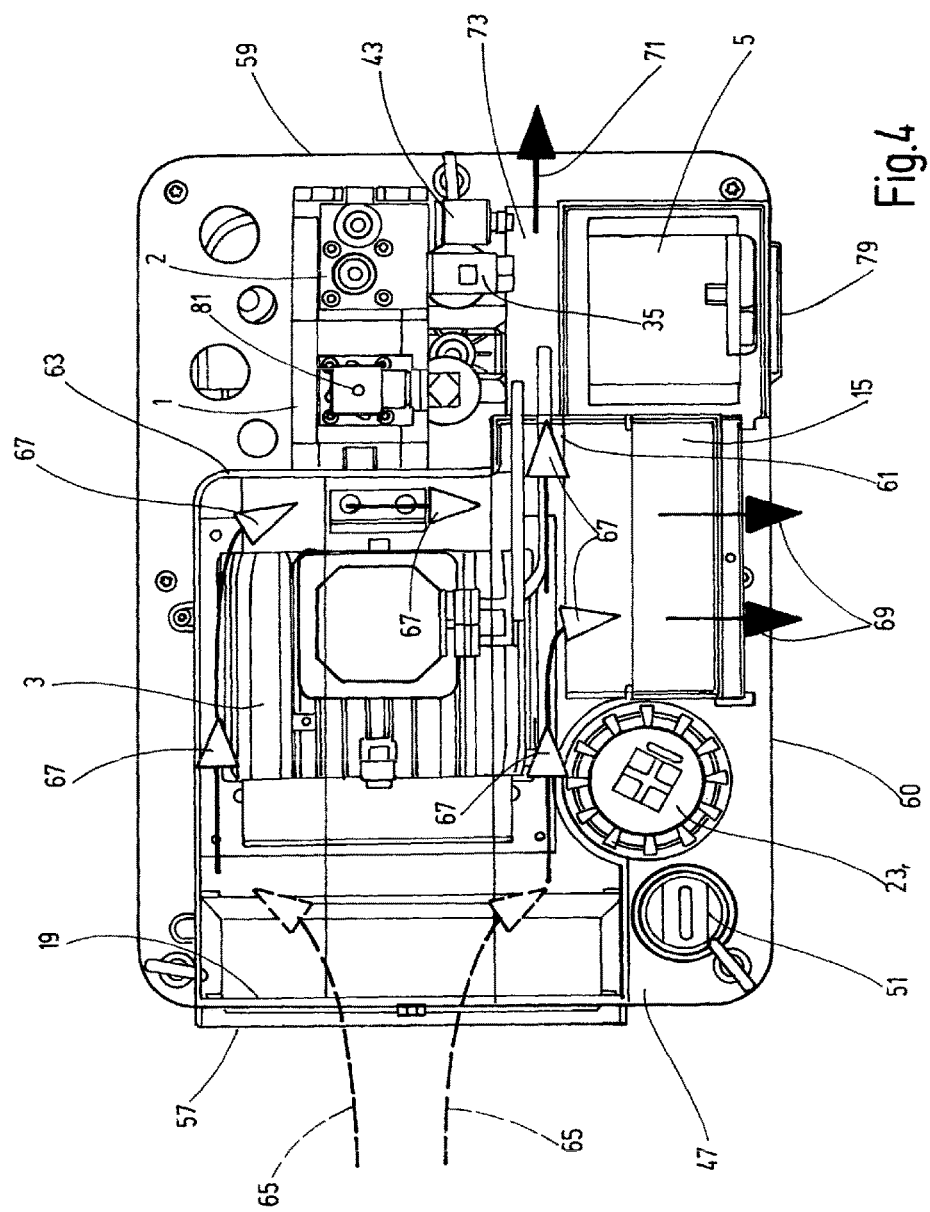
FIG. 4 is a top plan view of the exemplary embodiment of the compact unit on a scale somewhat larger compared to FIGS. 2 and 3, with a housing cover removed from the housing base part.

FIGS. 2 through 4 illustrate the mechanical structure of the unit. As shown, the unit housing 45 has a largely rectangular contour. The tank 7 forms the base part of the housing 45 and extends approximately over the entire base surface and to approximately half the height of the housing 45. The upper side of the tank 7 is closed off by a planar support plate 47, on which support plate the essential components are assembled. In FIG. 2, a fill level indicator 49 is attached to the side of the tank 7, as well as a filler neck 51 and the end cap 53 of the optional return line filter 23 (FIG. 1) on the upper side of the support plate 47. A box-like housing cover 55 is visible in both FIGS. 2 and 3, which, as shown by the comparison with FIG. 4, surrounds the fan 19 and the electric motor 3 located at the housing front side 57. The electric motor is connected to the fan 19 away from the housing front side 57 in the direction toward the housing rear side 59. The heat exchanger 15 connected to an outlet opening 61 of the housing cover 55 and the contour line or connecting line, indicated on the cover plate 47 in FIG. 4 by a double line 63, are mounted on the support plate 47 between the electric motor 3 and the housing side 60 situated below in FIG. 4. Other control blocks such as, for example, valve modules having functions other than those described above may also be accommodated on the support plate 47 and/or inside the device housing 45.

The airflow, indicated with dash-lined flow arrows 65, generated by the fan 19 is guided in the configuration shown in the form of a first partial flow designated by light arrow heads 67. The air of the first partial flow flows around the electric motor 3. A directly following second partial flow, indicated by black arrow heads 63, flows in series relative to the first partial flow through the heat exchanger 15 as a transverse flow. An additional third partial flow, which continues the first partial flow 67 in the direction of the housing rear side 59 and, in that respect, again in succession, exits there, as is shown by an arrow also provided with black arrowhead 71, after which it flows through ventilation blades 73, which ventilation blades form a cooling lamella assembly for cooling the frequency converter 5 connected to the heat exchanger 15. A display 77 for indicating operating data, as well as a sealing flap 79 for covering electrical connection devices are visible on the converter housing 75 of the frequency converter 5 in FIG. 2. Thus, the circuit board of the frequency converter 5 is integrated in the housing 45, specifically, in a dust-proof and spray-protected design. An overpressure condition is created inside the housing 45 essentially sealed to the outside, in particular, during operation of the compact unit. The overpressure stops foreign particles from outside sources from penetrating into the interior of the housing 45, so that a higher protection class for the compact unit, in this case, IP 54 is readily achieved.

The cooling airflow, conditioned by the rotation of the fan blades of the fan 19, is guided helically around the outer housing of the electric motor 3 and uniformly brushes over the longitudinal cooling ribs disposed on the outside thereof. To achieve a forced guidance for the cooling airflow, the flow conductor preferably provides a uniform spacing between the outer circumferential side of the electric motor 3 and the cross sectional surface of the housing 45, cylindrical in cross section, to which it may be allocated. To prevent an accumulation of heat on the rear side of the electric motor 3 facing away from the fan 19, a large-dimensioned flow-through space is provided, formed by the rear side of the electric motor and the adjacent front wall of the housing 45 for accommodating the electric motor 3. In this rearward area, the cooling airflow (arrowheads 67) is deflected at a right angle to the other flow-through direction of the fan 19 and, with this diversion, flows through the oil-air heat exchanger 15. The tank 7 used each time, which, as seen upward in the viewing direction of FIGS. 2 and 3, is covered by the support plate 47, may be variously designed in terms of its height, and thus may accommodate different tank supply volumes. Tank 7 is preferably of plastic or die-cast aluminum.

In addition, the cooling air is also guided along a straight line and flows through the cooling lamellas of the frequency converter 5 in such a way that the airflow is split and conducted in parallel between the cooling lamellas. After passing the cooling lamellas or cooling vanes 73 of the frequency converter 5, the cross sectional profiles expand toward the surroundings, so that no flow resistance is able to build up as the flow passes through cooling lamella assembly. A great advantage is that the fan 19, as described above, may not only be driven during operation under pressure, but may also guide the airflow in the opposite direction through the compact unit with its components, by reversing the direction of rotation of the fan blades while suctioning during negative pressure operation. Such a reverse operation could be practical when, for example, sensors, not further depicted, determine that the frequency converter 5 or the heat exchanging device 14 is at a temperature higher than the normal operating temperature, in order in this way to cool these components upstream from the electric motor 3 as viewed in the flow direction.

As also indicated in FIGS. 2 and 3, the hydraulic pumps 1 and 2 are disposed outside the housing cover 55 between the cover and the housing rear side 59, and are provided with the auxiliary devices, such as pressure limiting valve 35, pressure sensor 43 and a contamination indicator 81. If a plastic is provided as the material for the unit housing 45, a corresponding color scheme of the housing may be implemented in a simple manner at the customer's request by dyeing the plastic material. In the case of a transparent design of the tank 7, a fill level indicator could also be eliminated. Owing to the compact design on the tank 7 serving as the housing base, the unit may be simply and conveniently converted for use at alternating locations. The forced ventilation of the electric motor 3 allows the use of cost-effective motor designs, and therefore, enables a corresponding efficient manufacture. Given the modular construction of the housing 45, support plate 47 and tank 7, the individual components may be assembled within a broad framework in the sense of a modular system for adapting the compact unit to on-site demands. This flexibility of the design and assembly also extends even to the hydraulic components of the compact housing being used.

While one embodiment has been chosen to illustrate the invention, it will be understood by those skilled in the art that various changes and modifications can be made therein without departing from the scope of the invention as defined in the claims.

The invention claimed is:

1. A compact unit, comprising:
   a unit housing having housing parts that together form said unit housing;
   an electric motor being accommodated in said housing parts and giving off heat during operation thereof;
   a first hydraulic pump on said unit housing and driven by said electric motor;
   an air-heat exchanger in said unit housing;
   a fan in said unit housing, drivable to generate an air flow and located upstream of electric motor and said air-heat exchanger; and
   a flow conductor being in said unit housing and guiding the air flow of said fan into a first air flow flowing around said electric motor and into a second partial air flow flowing toward said air-heat exchanger said flow conductor guiding the first air flow and second partial air flow in series first towards said electric motor and then towards said air-heat exchanger.

2. A compact unit according to claim 1 wherein said flow conductor guides the first air flow into a third partial air flow and conveys the third partial air flow as a cooling air flow to a frequency converter connected to and controlling said electric motor.

3. A compact unit according to claim 2 wherein said flow conductor defines a first flow path for the air flow extending between a front side and an opposite rear side of said unit housing and defines a second flow path branching off from said first flow path toward one side of said unit housing, said fan, said electric motor and a cooling body of said frequency converter being in said first flow path, said air-heat exchanger being in said second flow path.

4. A compact unit according to claim 3 wherein said second flow path branches off from said first flow path at a right angle.

5. A compact unit according to claim 2 wherein said frequency converter being connected with said air-heat exchanger.

6. A compact unit according to claim 1 wherein a second hydraulic pump is on said unit housing, said first and second hydraulic pumps being connected on first and second intake sides thereof to a tank of said unit housing supplying hydraulic fluid to said hydraulic pumps, said first hydraulic pump being connected to and generating a fluid flow through said air-heat exchanger to said tank, said second pump providing fluid pressure to working hydraulics, the first air flow and the second partial air flows being separate from said fluid flow.

7. A compact unit according to claim 6 wherein first and second filters are provided between said tank and said first and second intake sides, respectively, of said hydraulic pumps.

8. A compact unit according to claim 6 wherein said tank forms a base part of said unit housing, said tank having a cover plate, said fan, said electric motor and said first and second hydraulic pumps being aligned and disposed on said cover plate in an axial direction of said fan, said air-heat exchanger being disposed on said cover plate alongside said electric motor; and a frequency converter connected to and controlling said electric motor is disposed alongside said hydraulic pumps.

9. A compact unit according to claim 8 wherein said cover plate of said tank and a housing cover of said unit housing surround said fan and said electric motor and are components of said flow conductor.

10. A compact unit according to claim 1 wherein said unit housing is at least partially of one of plastic or die-cast aluminum.

11. A compact unit, comprising:
    a unit housing having housing parts that together form said unit housing;
    an electric motor being accommodated in said housing parts and giving off heat during operation thereof;
    a first hydraulic pump on said unit housing and driven by said electric motor;
    an air-heat exchanger in said unit housing; and
    a fan in said unit housing and drivable to generate an airflow flowing in succession toward said electric motor and then toward said air-heat exchanger, said fan being upstream of said first hydraulic pump and said air-heat exchanger relative to said air flow.

12. A compact unit according to claim 11 wherein the air flow comprises a cooling air flow to a frequency converter connected to and controlling said electric motor.

13. A compact unit according to claim 11 wherein a second hydraulic pump is on said unit housing, said first and second hydraulic pumps being connected on first and second intake sides thereof to a tank in said unit housing supplying hydraulic fluid to said hydraulic pumps, said first hydraulic pump being connected to and generating a fluid flow through said air-heat exchanger to said tank, said second pump providing fluid pressure to working hydraulics, the airflow being separate from said fluid flow.

14. A compact unit according to claim 13 wherein first and second filters provided between said tank said and each of said intake sides of said hydraulic pumps.

15. A compact unit according to claim 13 wherein said tank forms a base part of said unit housing, said tank having a cover plate, said fan, said electric motor and said first and second hydraulic pumps being aligned and disposed on said cover plate in an axial direction of said fan, said electric motor and said first and second hydraulic pumps from a front side to a rear side of said cover plate, said air-heat exchanger being disposed on said cover plate adjacent said electric motor; and a frequency converter connected to and controlling said electric motor is disposed alongside said hydraulic pumps.

16. A compact unit according to claim 15 wherein said cover plate of said tank and a housing cover of said unit housing surround said fan and said electric motor.

17. A compact unit according to claim 11 wherein said unit housing is at least partially of one of plastic or die-cast aluminum.

* * * * *